US008849264B2

(12) United States Patent
Rebstöck

(10) Patent No.: US 8,849,264 B2
(45) Date of Patent: Sep. 30, 2014

(54) COMPUTER PROGRAM, METHOD, AND SYSTEM FOR SHARING INFORMATION ABOUT A TIME AVAILABILITY OF A TELEPHONE USER

(71) Applicant: Rebstöck Counsulting s.r.o., Praha 1 (CZ)

(72) Inventor: Martin Rebstöck, Susice (CZ)

(73) Assignee: Rebstock Consulting s.r.o. (CZ)

( * ) Notice: Subject to any disclaimer, the term of this patent is extended or adjusted under 35 U.S.C. 154(b) by 39 days.

(21) Appl. No.: 13/667,239

(22) Filed: Nov. 2, 2012

(65) Prior Publication Data

US 2013/0295897 A1    Nov. 7, 2013

(30) Foreign Application Priority Data

May 4, 2012   (EM) .................. 002037408-0002
May 4, 2012   (EM) .................. 002037408-0004
May 4, 2012   (EM) .................. 002037408-0006
Sep. 25, 2012 (CZ) .......................... 2012-658

(51) Int. Cl.
*H04W 4/00* (2009.01)

(52) U.S. Cl.
USPC .......................................... 455/415; 455/417

(58) Field of Classification Search
USPC ........... 455/415, 404.2, 417, 445; 379/142.04
See application file for complete search history.

(56) References Cited

U.S. PATENT DOCUMENTS

2012/0213355 A1*   8/2012   Ishibe ......................... 379/251

* cited by examiner

*Primary Examiner* — Sam Bhattacharya
(74) *Attorney, Agent, or Firm* — Hovey Williams LLP

(57) ABSTRACT

Embodiments of the present invention provide for the sharing of information about the time availability of a telephone user. Initially, at least one status is set in a telephone of user. The status may contain information about the current or future availability or busy status of the user and/or the user's ability to accept or decline phone and/or video calls. A caller who is preparing to make a phone and/or video call to user, is provided with a real-time graphic, textual and/or audio interpretation of the status of the user. The status may further include the time and/or date on which the user will be available for an incoming call, or it may additionally include any graphic, textual, and/or audio message entered by the user.

3 Claims, 4 Drawing Sheets

COMPUTER PROGRAM, METHOD, AND SYSTEM FOR SHARING INFORMATION ABOUT A TIME AVAILABILITY OF A TELEPHONE USER

RELATED DESIGNS AND APPLICATIONS

I hereby claim foreign priority benefits under Title 35, United States Code, §119 of any foreign patent applications for patent, inventor's certificate or design listed below and have also identified below any foreign application for patent, inventor's certificate or design having a filing date before that of the application on which priority is claimed: European Community Registered Community Design 002037408-0002 filed May 4, 2012 and issued May 14, 2012 (priority claimed); European Community Registered Community Design 002037408-0004 filed May 4, 2012 and issued May 14, 2012 (priority claimed); European Community Registered Community Design 002037408-0006 filed May 4, 2012 and issued May 14, 2012 (priority claimed); and Czech Republic Patent Application PV 2012-658, filed Sep. 25, 2012 (priority claimed), the entire disclosures of which are incorporated herein by reference.

FIELD

Embodiments of the present invention are directed to the field of telecommunications and are related to the sharing of information about the time availability of a computing device user. Specifically, embodiments of the present invention are directed to a process of sharing information about the time availability of a computing device user, with the availability indicated by least one status, which is set in a computing device of the user. The status may contain information about the current availability, future availability, or busy status of user or the user's ability to accept or decline phone and/or video calls. A caller, who is preparing to make a phone and/or video call to the user, is provided with a real-time graphic, textual, and/or audio interpretation of the status of the user. The status may be provided to the caller after either (1) the caller displays the telephone number of the user in the caller's telephone contacts list, or (2) the caller dials the user's telephone number, if the dialed number is not in the caller's contacts list. The status may further include a time and/or date on which the user will be available for an incoming call, or it may also include any graphic, textual, and/or audio message entered by the user.

RELATED ART

It is currently the common practice of telephone users (especially users of mobile phones) that if they wish not to be disturbed, they will turn the ringtone of their telephones off. Another alternative is to switch the telephone to the "airplane" mode, or switch the phone off completely. However, it is currently not possible to indicate the user's status (i.e., availability or non-availability) otherwise than by trying to contact the user's telephone.

If the user is unable to respond to an incoming call, the ringing will either be left without response, or the telephone network will send an automatic message according to which the user is not available or that the user does not respond. In an extreme case, the user's voice mail will be activated, in which case the caller will be charged. All this means a time loss, and in some instances a financial loss, for the caller, owing to the connection to the user's voice mail or to the user who will only inform the caller that the user is busy and would like to ask the caller to call back later.

SUMMARY

Embodiments of the present invention provide a computer program, a method, and a system for sharing a time availability of a user. Specifically, embodiments of the present invention receive information related to the status of the user, with the status representing an availability of the user to accept or participate in telephone calls. Upon receiving an indication that a caller is preparing to make a telephone call to the user, embodiments of the present invention provide the caller with a notice indicative of the user's status in the form of a graphic, textual, and/or audio representation.

Embodiments of the present invention further provide for a visibility condition of the user to be received, with the visibility condition indicating the user's desire for the user's status to be viewable by specified callers. For instance a public visibility condition indicates that the status is viewable by all callers; a semi-public visibility condition indicates that the status is viewable by callers whose telephone numbers are included in a contacts list stored within a computing device of the user; and a private visibility condition indicates that the status is viewable by callers otherwise specifically indicated by the user. In such an embodiment, only certain callers indicated by the visibility condition are provided with the user's status.

Further, embodiments of the present invention provide follow-up notices to callers that were previously provided with a notice indicating that the user was unavailable to take or participate in a telephone call. The follow-up notices are indicative of the user's present status and are provided to the caller upon the occurrence of at least one of the following: an expiration of a specified amount of time from when the notice indicating that the user was initially unavailable was provided; the user's status changes from unavailable to available; and/or the user's status is set to change from unavailable to available within a scheduled amount of time.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

DETAILED DESCRIPTION

Figure 1:
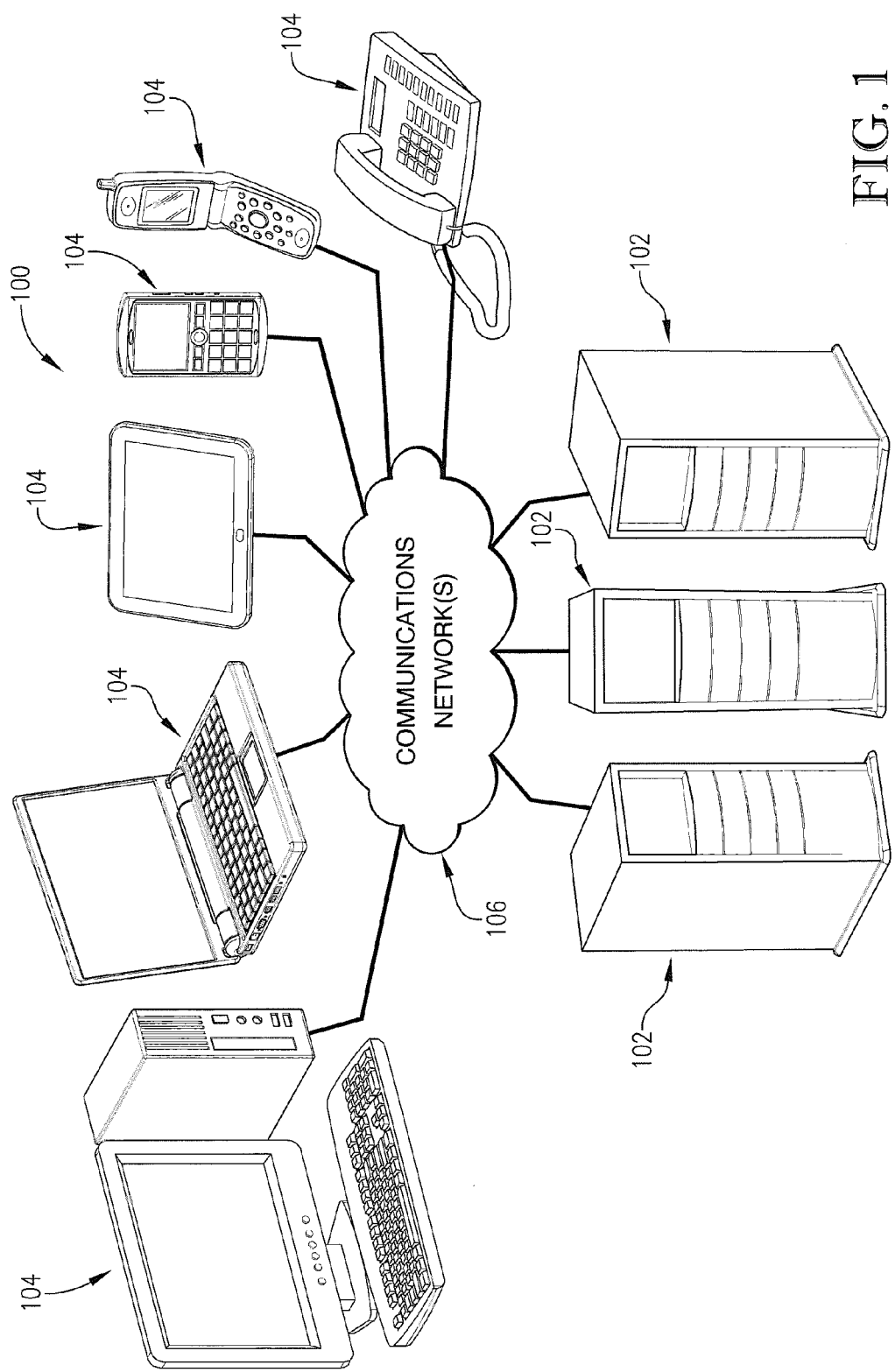
FIG. 1 is a schematic depiction of a system for sharing information regarding a time availability of a telephone user, constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention provides various embodiments of a computer program, a method, and a system for sharing information about the time availability of a telephone user. The computer program and the method of embodiments of the present invention may be implemented in hardware, software, firmware, or combinations thereof using system 100, shown in FIG. 1, which broadly comprises server devices 102, computing devices 104, and a communications network 106. The server devices 102 may include computing devices that provide access to one or more general computing resources, such as Internet services, electronic mail services, data transfer services, and the like. The server devices 102 may also provide access to a database that may store content and other information, such as user statuses, telephone numbers, lists, or other information necessary for the operation of the computer program, method, and system of the present invention.

The computing devices 104 may include any device, component, or equipment with a processing element and associated memory elements. The processing elements may implement operating systems, and may be capable of executing the computer program, which is also generally known as instructions, commands, software code, executables, applications, apps, and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements included in the computing devices 104, the server devices 102 may further include file stores comprising a plurality of hard disk drives, network attached storage, or a separate storage network.

The computing devices 104 may include mobile communication devices (including wireless devices), work stations, desktop computers, laptop computers, palmtop computers, tablet computers, portable digital assistants (PDA), smart phones, and the like, or combinations thereof. Specifically, various embodiments of the computing device 104 may also include voice communication devices, such as cell phones or landline phones. The computing device 104 may have an electronic display, such as a cathode ray tube, liquid crystal display, plasma, or touch screen. In certain embodiments, the computer program of the present invention may facilitate interaction and communication through a graphical user interface (GUI) that is displayed via the electronic display.

The communications network 106 may be wired or wireless and may include servers, routers, switches, wireless receivers and transmitters, and the like, as well as electrically conductive cables or optical cables. The communications network 106 may also include local, metro, or wide area networks, as well as the Internet, or other cloud networks. Furthermore, the communications network 106 may include cellular or mobile phone networks, as well as landline phone networks or public switched telephone networks.

Both the server devices 102 and the computing devices 104 may be connected to the communications network 106. Server devices 102 may be able to communicate with other server devices 102 or computing devices 104 through the communications network 106. Likewise, computing devices 104 may be able to communicate with other computing devices 104 or server devices 102 through the communications network 106. The connection to the communications network 106 may be wired or wireless. Thus, the server devices 102 and the computing devices 104 may include the appropriate components to establish a wired or a wireless connection.

The computer program of the present invention may run on the computing device or, alternatively, may run on one or more server devices 102. Thus, a first portion of the program, code, or instructions may execute on a first server device 102 or the computing device 104, while a second portion of the program, code, or instructions may execute on a second server device 102 or the computing device 104. In some embodiments, other portions of the program, code, or instructions may execute on other server devices 102 as well. For example, a status of the user, which is described in more detail below, may be stored on a memory element associated with the server device 102, such that the status may be provided to computing devices 104 via the server. Alternatively, the user status may be stored on the memory element associated with the computing device 104 of the user.

In embodiments of the present invention, a downloadable version of the computer program may be stored, at least in part, on the server device 102. A user can download at least a portion of the computer program onto a computing device via the network 106. In embodiments of the present invention, the computer program is an "application," such as an "app" for a mobile device. After the computer program has been downloaded, the program can be installed on the computing device in an executable format. In additional embodiments, the computer program of the present invention may be pre-installed by a manufacturer of the computing device during the device's manufacture, such that the computer program is part of the computing device's factory installed software.

Figure 2:
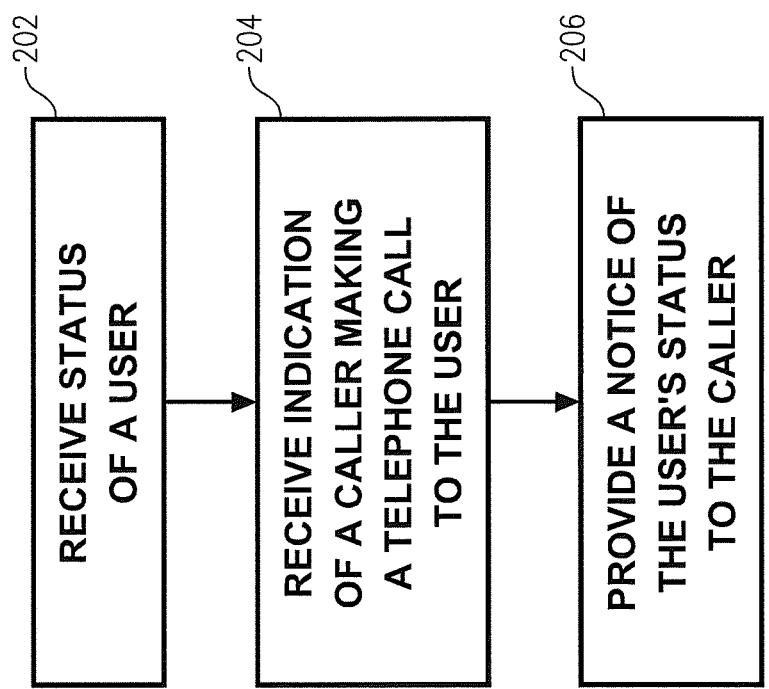
FIG. 2 is a flowchart of a method for sharing information regarding a time availability of a telephone user in accordance with embodiments of the present invention.

As illustrated in FIG. 2, embodiments of the present invention comprise the initial Step 202 of receive information indicative of a status of the user, with the status representing an availability of the user to accept or participate in a telephone call. In Step 204, embodiments of the present invention receive an indication that a caller is preparing to make a telephone call to the user. In Step 206, upon receiving information indicative of the caller preparing to make a telephone call, the caller is provided with a notice indicative of the user's status in the form of a graphic, textual, and/or audio representation.

Initially, at least one status is set via the user's computing device, using a software application of embodiments of the present invention. The status may contain information about the current availability, future availability, or busy status of user or the user's ability to accept or decline phone and/or video calls.

The caller who is preparing to make a phone and/or video call with the user, via a computing device, is provided with a real-time graphic, textual, and/or audio notice, or representation, of the user's status. The graphic representation may comprise symbols, icons and/or text. The textual representation may include alphanumeric characters, symbols, or the like. The audio representation may comprise voice, beeps, rings, etc. The user's status is provided either after the user's phone number is displayed in the caller's contacts list and/or after the caller dials the user's phone number, which is otherwise not entered in the caller's contacts list. In certain embodiments of the present invention, after the user's phone number is displayed in, or dialed by, the caller's computing device, the caller's computing device may query the user's computing device and/or the server device 106 (which may be virtually in the "cloud"), using the network 102. In response to the query from the caller's computing device, the server device may query the user's computing device to obtain information regarding the user's status. Thereafter, the server device may provide the user's status to the caller's computing device. In additional embodiments of the present invention, the user's status may be continually provided, or periodically updated (i.e., every 5, 10, 30, or 60 seconds), to the server device 106 via the network 102. In such an embodiment, upon the caller displaying, or dialing, the user's phone number in the caller's contacts list, the status of the user is automatically sent from the server device to the caller's computing device, similar to an on-demand feature. In even further embodiments, the user's status may be continually provided, or periodically updated (i.e., every 5, 10, 30, or 60 seconds), to the server device 106, and the status may be continually provided, or periodically pushed (i.e., every 5, 10, 30, or 60 seconds), to the caller's computing device. In such an embodiment, the caller's computing device would continuously, or periodically, receive the user's status, such that the caller's computing device would not be required to query either the server device 106 or the user's computing device each time a user's status is needed.

Figure 3:
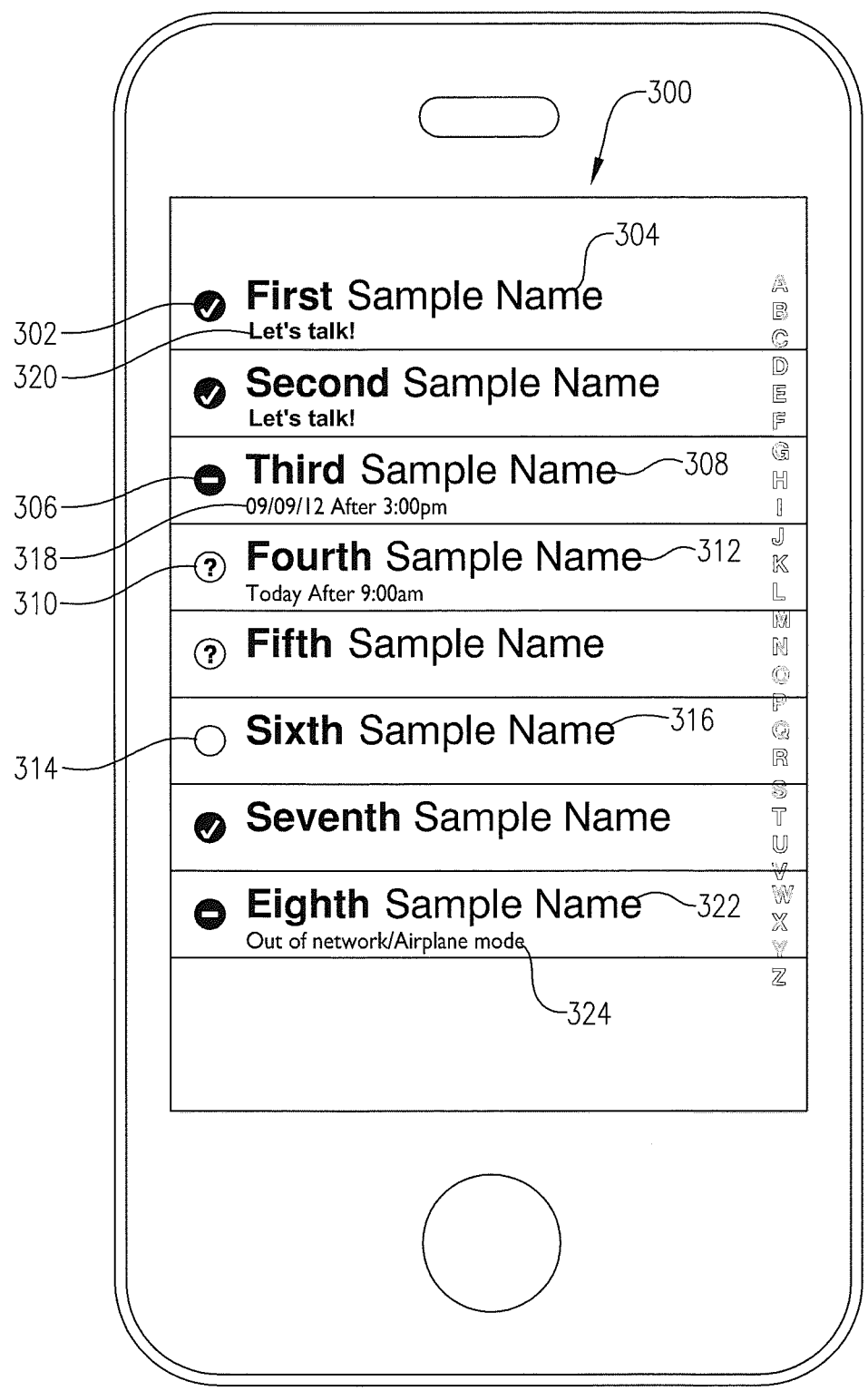
FIG. 3 is an illustration of user statuses, messages, and availability times displayed on a caller's computing device.

As an illustration of providing user statuses to a caller, FIG. 3 illustrates a contacts list 300 on a computing device of a caller. In FIG. 3, graphic representations of statuses of a grouping of users included in the caller's contacts list are provided. The statuses are displayed adjacent to each of the users' names. For instance, a checkmark 302 enclosed in a circle is provided adjacent to a user's name identified by First Sample Name 304. In certain embodiments, the checkmark 302 may represent that the user identified by First Sample Name 304 is currently available to answer phone and/or video calls. In addition, a minus sign 306 enclosed in a circle is provided adjacent to a user identified by Third Sample Name 308. In certain embodiment, the minus sign 306 may represent that the user identified by Third Sample Name 308 is currently unavailable or busy to answer phone and/or video calls. A question mark 310 enclosed in a circle is provided adjacent to a user identified by Fourth Sample Name 312. In certain embodiments, the question mark 310 may represent that the user identified by Fourth Sample Name 312 is currently away or has an unclear status. A plain circle 314 without a mark imbedded is provided adjacent to a user identified by Sixth Sample Name 316. In certain embodiments, the plain circle 314 may represent that the user identified by Sixth Sample Name 316 is currently refusing to share a status or that the user does not have the computer program embodiments of the present invention installed on the user's computing device.

In addition to the graphic symbols that represent the users' statuses, the circles enclosing the symbols may include a plurality colors that further represent the status. For instance, the checkmark 302 may be enclosed in a green circle, with the green circle representing availability. The minus sign 306 may be enclosed in a red circle, with the red circle representing unavailability. The question mark 310 may be enclosed in a yellow circle, with the yellow circle representing an away or unclear status. The plain circle 314 may include an area with a gray, black, or white color, with such colors representing a refusal or inability to determine a status. However, such color examples are provided for exemplary purposes only, and embodiments of the present invention include the use of a plurality of colors.

In embodiments of the present invention, the status may further include a time and/or date on which the user will be available for an incoming call. The status may also include any graphic, textual, and/or audio message entered by the user. Such embodiments are advantageous for the optimization of the caller's time schedule, as the caller will know when it is best to repeat the call to the user. For instance, turning again to FIG. 3, contact list 300 may include an availability date and time 318 adjacent to the user identified by Third Sample Name 306, with the availability date and time 318 signifying that the user identified by Third Sample Name 306 will be available for a phone and/or video call after 3:00 pm on Sep. 9, 2012. In addition, contact list 300 may include an availability statement 320 adjacent to the user identified by First Sample name 302, with the availability statement 320 signifying that the user identified by First Sample Name 302 has provided a "Let's talk!" statement to the caller.

Due to the generality of the design, embodiments of the present invention may be used by all persons with computing devices 104 connected to the network 102, if the computing devices enable the starting and execution of software applications. Depending on the requirements of the user and/or the nature of the user's computing device (i.e., business or private), embodiments of the present invention may also provide for various visibility conditions to be set for sharing the user's status among different callers. Depending on the user's requirements, the status can be set as public, i.e., the status is visible to all callers according to the procedure specified above. The status may also be semi-public, i.e., the status is only visible to callers whose phone numbers have been entered in the contacts list of the user's computing device. The third option is a private status, i.e., the status is only visible to callers specifically selected and marked in the user's computing device. The public status, may for example, be used by professionals or public officers, such that whomever may need to call such users will be able to see whether the users are available for a call. Semi-public status may, for example, be used among friends. And finally, private status may be ideal for family members. In addition, in certain embodiments of the present invention, multiple visibility conditions may be set simultaneously. For instance, on holidays, the user may set the public status to unavailable, while the semi-public or private status, may simultaneously show availability.

Embodiments of the present invention provide for users to set their statuses manually, via manipulation of their computing devices. In additional embodiments of the present invention, statuses may be set automatically, depending on for instance: the user-selected type and/or volume of a ringtone of the computing device, the call profile of the user's computing device, the computing device being switched off, the user currently using the computing device for a call, the computing device being disconnected from the communications network, or the computing device otherwise losing a cellular signal. For instance, turning again to FIG. 3, the contact list 300 may include an automated availability message 324 adjacent to the user identified by Eight Sample Name 322, with the automated availability message 324 providing that the user identified by Eight Sample Name 322 is currently out of cellular network range or the user's computing device is in airplane mode. Such automated availability message 324 may be set automatically when the user identified by Eight Sample Name 322 travels out of cellular signal coverage or turns the computing device to airplane mode. Embodiments of the present invention provide advantages that include being simple to use and saving the user's time. In addition embodiments of the present invention also provide for automatically displaying unavailability due to depletion of the computing device battery or loss of the phone operator's signal, which users may not even notice.

If a caller has previously made an unsuccessful attempt at calling a user, embodiments of the present invention may provide for the computing device to alert the caller about the availability of the previously unavailable user. In such an embodiment, the alert, or follow-up notice, may be provided according to the time and/or date from when the user's initial status was provided. For instance, the follow-up notice may be provided after the elapse of thirty minutes from the time the initial status was provided. Or, for instance, the follow-up notice may be provided either at some specified time or in advance of a specified time, as the user and/or caller may define. In addition, the alert, or follow-up notice, may have the form of a single or repeating event.

The availability alert, or follow-up notice, of a previously unavailable user may be displayed via the caller's computing device. The caller's computing device may display the follow-up notice in the form of marking the user's current and/or future availability in an electronic or on-line calendar, in a contacts list, in the list of the called numbers, or in the graphic user interface of another application and/or computing device. Such other computing devices may, for instance, include telephones, PCs, tablets, TV sets, or the like. It is also possible to make use of laptops, notebooks, monitors, watches, electronic glasses, music players and other peripherals and hands-free devices, etc., including digital displays and displays in cars, aircraft, trains and other vehicles. Thus, the status change can be viewable to a caller without the caller having to watch their computing device. This is ideal for user optimization, long-term time efficiency, and the time and cost savings of both users and callers. It is also convenient for users and callers using more devices for phone and video calls and/or users and callers who are not able and/or willing to answer every phone call at a specific time.

Computer program embodiments of the present invention may be an integral part of produced and/or manufactured computing devices, or the operating system and/or software application of such computing devices. Additionally, computer program embodiments may be installed subsequently by the user or the caller, or by a third party with the user's or caller's consent. Thus, the computer program of embodiments of the present invention may either be included in the factory settings of the computing device or may be installed into already existing computing device. As described above, embodiments of the present invention are applicable to all networks, whether telephone (wireless networks, satellite telephone network, cable or wired networks), as well as on the Internet, TV networks, etc.

The embodiments of the present invention for sharing information about the time availability of a computing device user serves especially for time optimization and the cost saving for those who make use of it. Thus, users and callers can plan their phone and/or video calls and minimize the risk of trying to repeatedly reach a user who is not and/or will not be able to answer the incoming call. Due to the user's availability being displayed prior to the call, the time savings are also accompanied with the saving of the cost of calls where the called user merely informs the caller that the user is currently busy and cannot talk.

EXAMPLES

Example 1

Figure 4:
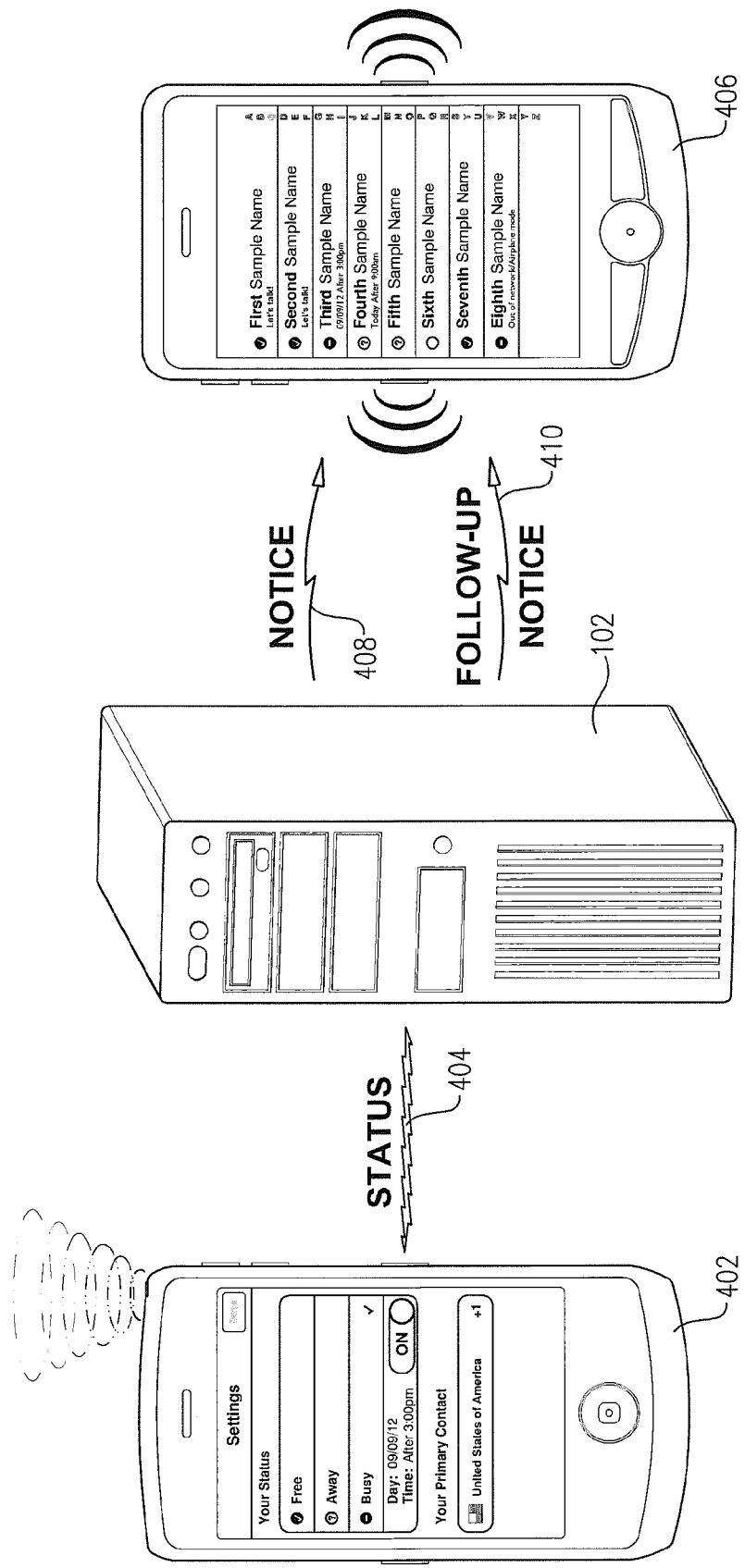
FIG. 4 is an illustration of the information flow and corresponding types of information included in embodiments of the present invention.

Returning to the figures, FIG. 4 illustrates an example of embodiments of the present invention for sharing information about the time availability of a user of computing device 402. Initially the user sets a status using the computing device 402. In the present example, this may have been initiated at the start of a business meeting. The status comprises information about the unavailability, or busy status, of the user and about the user's inability to answer or reject phone calls. The status may include the date and time that user will be available, which may be for instance at 3 pm on Sep. 9, 2012. Once the user has entered the status on the computing device 402, information indicative of the status 404 may be received by the server 102 via the communications network. In addition to the status, the user may also select a public visibility condition, information indicative of which, is also received by the sever 102. For instance, the public visibility condition provides for the user's status to be provided to all callers.

Next, a caller who is preparing to make a phone call to the user is provided with a real-time graphic, textual and/or audio notice 408 of the user's status 404. The notice 408 is provided to the caller after the caller displays the user in the contacts list of the caller's computing device 406. For instance, in the present example, the user may be identified as Third Sample Name in the caller's contacts list of computing device 406. The notice 408 of the user's status 404 may be provided to the caller's computing device 406 from the sever 102 via the network. The notice 408 provides an indication that the user is currently busy or unable to answer a phone and/or video call, but will be available after 3:00 pm on Sep. 9, 2012.

Next in the present example, at 2:55 pm, the caller's computing device 406 may alert the caller about an upcoming availability of the previously unavailable user, whom the caller previously attempted to call, without success. The alert, or follow-up notice 410, may be provided to the caller's computing device 406 from the server 102 via the network. The follow-up notice 410 is based on an availability time and date that was included in the status 404 of the user. At 3 pm, the caller's computing device 406 may repeat the follow-up notice.

Because the user's computing device 402 enables the display of alphanumeric characters, symbols, status icons, and/or other messages set by the user, embodiments of the present invention may be an integral part of factory produced computing device 402, or its operating system and/or software applications.

Example 2

As an additional example of embodiments of the present invention for the process of sharing information about the time availability of a user of a computing device, the user, during a weekend, sets two statuses using a computing device. A first status is public, while a second status is semi-public. The first status comprises information about the unavailability of the user and about the user's inability to answer phone and/or video calls. Furthermore, the first status may include the date and time that user will be available for incoming calls, which is provided as Monday at 8 am. The first status is provided to those potential callers, whose numbers are not entered in a contacts list of the user's computing device. The second status contains information about the current availability of user and the user's ability to accept or decline phone and/or video calls. The second status is provided to those potential callers whose numbers are entered in a contacts list of the user's computing device.

A first caller, via a computing device, whose phone number is not entered in the list of contacts of the user's computing device and who is preparing to make a phone call to the user, is provided, after displaying the phone number of the user in a list of contacts in the first caller's computing device, with a real-time graphic, textual, and/or audio notice of the first (public) status of the user.

Subsequently, during the course of the weekend, a second caller whose phone number is entered in the list of contacts of the computing device of the user and who is preparing to make a video call to the user, is provided, after displaying the phone number of the user in a list of contacts in the second caller's computing device, with a real-time graphic notice of the second (semi-public) status of the user. Thus, potential callers, whose phones numbers are entered in the list of contacts of the user's computing device are only displayed the second (semi-public) status.

Example 3

As a further example of embodiments of the present invention for sharing information about the time availability of a user of a computing device, a status of the user is received from the user's computing device by the server via the communications network. In the present example, the status is automatically received after the loss of a cellular signal of the user's computing device. For instance, the status may be received while the user is on an airplane, and the computing device becomes disconnected from the communications network. The status is public and includes information about the current unavailability of the user. In addition, the status contains information that the computing device of the user is now disconnected from the communications network, or switched off. In the present case, however, the status is neither an automatic provision of data or information regarding the position of the user. Thus, embodiments of the present invention may not be used by callers or third parties for any form of monitoring, search, or geolocation tracking. Next, each caller who is preparing to make a phone and/or video call to the user is provided with a real-time graphic, textual, or audio notice of the status of the user.

After the user's computing device is switched on again and/or reaches the signal of the communications network, the caller's computing device will alert the caller about the availability of the previously unavailable user, whom the caller has previously attempted to call, without success.

To ensure quick distribution of the user's status, or follow-up notices, certain embodiments of the present invention, as discussed above, may provide for the user's statuses or notices to be continuously provided, or periodically pushed, from the server device to the caller's computing device to be recorded or saved. Thus the current availability of the user may be provided to the calendar, contacts list, and/or the list of the called numbers of the caller's computing device without the caller's computing device being required to query the server device or the user's computing device. In addition, however, embodiments of the present invention contemplate that the caller's computing device may be required to query the server device to obtain the user's status, or follow-up notices. Such a query by the caller's computing device may occur after the user's phone number is dialed, or displayed, in the caller's computing device. In such embodiments, the user's status, or follow-up notices, may be obtained by the server device after the server device queries the user's computing device. Alternatively, the user's status may be automatically, or periodically updated, from the user's computing device to the server device.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer readable storage medium with an executable program stored thereon for sharing information about a time availability of a user,
  wherein the program instructs the processor to perform the following steps:
    receive information indicative of a status of the user, wherein the status represents an availability of the user to accept telephone calls on a first computing device;
    receive, via a second computing device, information indicative of a caller preparing to make a telephone call to the user's first computing device, wherein the information indicative of the caller preparing to make the telephone call includes one or more of the following
      the caller displaying a telephone number of the user on the second computing device,
      the caller dialing the telephone number of the user with the second computing device; and
    upon receiving information indicative of the caller preparing to make a telephone call to the user, provide a notice indicative of the user's status to the second computing device of the caller, wherein the notice includes one or more of the following
      a graphic representation of the user's status,
      a textual representation of the user's status, and
      an audio representation of the user's status; and
    receive information indicative of the user selecting a visibility condition, wherein the visibility condition is selected from at least one of the following
      a public visibility condition,
      a semi-public visibility condition, and
      a private visibility condition, wherein, if the public visibility condition is selected, the processor is operable to provide the notice indicative of the user's status to all callers, wherein, if the semi-public visibility condition is selected, the processor is operable to provide the notice indicative of the user's status only to callers included on a contact list of the user's first computing device, wherein, if the private visibility condition is selected, the processor is operable to provide the notice indicative of the user's status only to callers included on a list of private callers of the user's first computing device.

2. A non-transitory computer readable storage medium with an executable program stored thereon for sharing information about a time availability of a user, wherein the program instructs the processor to perform the following steps:

receive information indicative of a status of the user, wherein the status represents an availability of the user to accept telephone calls on a first computing device, wherein the information indicative of the status of the user includes at least one of the following
a ringtone volume level of the first computing device;
an on/off status of the ringtone volume button;
an airplane mode status of the first computing device;
a telephone call alert profile of the first computing device;
an on/off status of the first computing device;
a telephone call status of the first computing device; and
a cellular signal strength of the first computing device;

receive, via a second computing device, information indicative of a caller preparing to make a telephone call to the user's first computing device, wherein the information indicative of the caller preparing to make the telephone call includes one or more of the following
the caller displaying a telephone number of the user on the second computing device,
the caller dialing the telephone number of the user with the second computing device;

upon receiving information indicative of the caller preparing to make a telephone call to the user, provide a notice indicative of the user's status to the second computing device of the caller, wherein the notice includes one or more of the following
a graphic representation of the user's status,
a textual representation of the user's status, and
an audio representation of the user's status.

3. A non-transitory computer readable storage medium with an executable program stored thereon for sharing information about a time availability of a user, wherein the program instructs the processor to perform the following steps:

receive information indicative of a status of the user, wherein the status represents an availability of the user to accept telephone calls on a first computing device;

receive, via a second computing device, information indicative of a caller preparing to make a telephone call to the user's first computing device, wherein the information indicative of the caller preparing to make the telephone call includes one or more of the following
the caller displaying a telephone number of the user on the second computing device,
the caller dialing the telephone number of the user with the second computing device;

upon receiving information indicative of the caller preparing to make a telephone call to the user, provide a notice indicative of the user's status to the second computing device of the caller, wherein the notice includes one or more of the following
a graphic representation of the user's status,
a textual representation of the user's status, and
an audio representation of the user's status, wherein the notice indicative of the user's status is that the user is unavailable to receive a telephone call, and further wherein the program instructs the processor to perform the following additional steps:

upon providing a notice indicative of the user's status, provide to the second computing device of the caller one or more follow-up notices indicative of an updated status of the user, wherein the one or more follow-up notices are provided after an occurrence of at least one of the following
an expiration of a specified amount of time from when the notice of the user's status was provided,
the user's status changes from unavailable to available, and
the user's status is set to change from unavailable to available within a scheduled amount of time.

* * * * *

UNITED STATES PATENT AND TRADEMARK OFFICE
CERTIFICATE OF CORRECTION

PATENT NO.        : 8,849,264 B2                                            Page 1 of 1
APPLICATION NO.   : 13/667239
DATED             : September 30, 2014
INVENTOR(S)       : Martin Rebstöck It is certified that error appears in the above-identified patent and that said Letters Patent is hereby corrected as shown below:

On the Title Page, item (71): named Applicant reading "Rebstöck Counsulting s.r.o." should read
- Rebstöck Consulting s.r.o. -

On the Title Page, item (73): named Assignee reading "Rebstock Consulting s.r.o." should read
- Rebstöck Consulting s.r.o. -

Signed and Sealed this
Seventeenth Day of February, 2015

Michelle K. Lee
*Deputy Director of the United States Patent and Trademark Office*